United States Patent [19]

Wewerka

[11] Patent Number: 4,572,057

[45] Date of Patent: Feb. 25, 1986

[54] PNEUMATIC OR HYDRAULIC ACTUATION DEVICE

[75] Inventor: Peter Wewerka, Schongau, Fed. Rep. of Germany

[73] Assignee: Hoerbiger Pneumatic Gesellschaft mbH, Schongau, Fed. Rep. of Germany

[21] Appl. No.: 631,762

[22] Filed: Jul. 17, 1984

[30] Foreign Application Priority Data

Oct. 21, 1983 [DE] Fed. Rep. of Germany ... 8330419[U]

[51] Int. Cl.[4] .................. F16J 1/14

[52] U.S. Cl. .................. 92/165 PR

[58] Field of Search .................. 92/166, 165 PR

[56] References Cited

U.S. PATENT DOCUMENTS 1,360,805 11/1920 Sherman et al. .................. 92/166
1,892,287 12/1932 Pearson et al. .................. 92/166
2,365,756 12/1944 Hastings .................. 92/166
2,895,151 7/1959 Link, Jr. .................. 92/166
3,377,847 4/1968 Aske .................. 92/166

FOREIGN PATENT DOCUMENTS 2456268 1/1981 France .................. 92/165 PR

*Primary Examiner*—Robert E. Garrett
*Assistant Examiner*—M. Williamson
*Attorney, Agent, or Firm*—Watson, Cole, Grindle & Watson

[57] ABSTRACT

The securing disc which is attached to the ends of piston rods located outside the cylinder of a fluid actuation device includes bores therethrough in which the ends of the piston rods can respectively extend, as well as slots which extend to each bore and clamping screws which extend transversely of each slot for closing the slot and fixedly clamping the end of the piston rod in the associated bore.

6 Claims, 2 Drawing Figures

PNEUMATIC OR HYDRAULIC ACTUATION DEVICE

BACKGROUND OF THE INVENTION

1. Field of the Invention

The invention relates to a pneumatic or hydraulic actuation device comprising a cylinder with a piston which is slideably guided in the cylinder and, for transmitting actuation movements, is provided with at least one piston rod that sealingly extends out of the cylinder, through a cylinder cover and is connected to a securing disc.

2. Description of the Prior Art

In known actuation devices of this type the securing discs, which are used to connect the actuation cylinder to the machine parts driven by the latter, are screwed on the ends of the piston rods. The piston rods are either provided with an outer thread, onto which a nut is screwed, or they have a threaded bore originating at their front end. In both cases, the securing disc is clamped rigidly against the front end or against a collar of the piston rod. This is a simple and reliable connection of machine parts. In practice, however, it has been shown that the screws on the securing disc become detached relatively easily and that, in constructions with a plurality of parallel piston rods, the latter may become trapped when extending and their guides are subjected to unexpectedly high stresses.

The object of the invention is to improve upon the known actuation devices of the initially-mentioned type of construction, in particular the construction with two or more parallel piston rods, in such a way that the connection of the securing disc to the ends of the piston rods cannot become loose unintentionally, nor does twisting of the piston rods with resultant over-stressing of the guides occur.

SUMMARY OF THE INVENTION

According to the invention there is provided an actuation device comprising:

a cylinder;

a cylinder cover secured to the cylinder;

a piston slideably guided in the cylinder;

at least one piston rod extending from the piston through the cylinder cover out of the cylinder;

means connecting the at least one piston rod to the piston;

means guiding the at least one piston rod through the cylinder cover and providing a seal between the at least one piston rod and the cylinder cover;

a securing disc;

and means connecting the securing disc to the at least one piston rod;

having the improvement that the last-mentioned means is formed as rigid clamping means rigidly clamping the securing disc to the at least one piston rod;

whereby twisting of the at least one piston rod is substantially prevented.

By means of this type of securing, twisting of the piston rod is avoided, which would sometimes occur when tightening nuts or screws screwed onto or into the end of the piston rod and would subsequently produce an untwisting effect which could cause the securing disc to become loose.

When, according to a preferred construction of the invention in order to ensure there is no twisting, a second piston rod is provided, on whose end the common securing disc is rigidly clamped, not only are actual measures to prevent twisting of the driven machine parts superfluous, but distortion of the piston rods is also avoided. When mounting the securing disc, the two piston rods remain aligned exactly parallel to each other such that when the piston extends they cannot become trapped and their guides are subjected to correspondingly less stress.

According to a further feature of the invention the securing disc for receiving the ends of the piston rods has bores, at which clamping slots originate, which are provided with clamping screws inserted transversely with respect to the clamping slots into the securing disc. When tightening these clamping screws, twisting or distortion of the piston rods is impossible. Moreover, a reliable connection of the securing disc to the piston rods is achieved in a simple manner without it being possible for disorders to occur.

In a further development of the invention threaded bores, extending axially in the ends of the piston rods, are provided in order to produce a direct drive connection between the piston rods and the machine parts to be driven. This is an improvement of the drive connection between the actuation cylinder and the apparatus driven by the latter. The threaded bores in the piston rods may, however, also be used to strengthen the connection to the securing disc. When the provided clamped connection is previously tightened, the piston rods can no longer be twisted or distorted, even by securing means screwed into their threaded bores at a later stage.

An advantageous embodiment of the invention finally consists in that the piston rods and the associated securing apertures in the securing disc are disposed centrally and symmetrically on a partial circle concentric to the cylinder axis and in that additional connection bores for connection of the machine parts to be driven are provided in the securing disc. This construction allows a simple connection of the driven machine parts without impairing the clamped connection between the securing disc and the piston rods.

DESCRIPTION OF THE PREFERRED EMBODIMENTS

Figure 1:
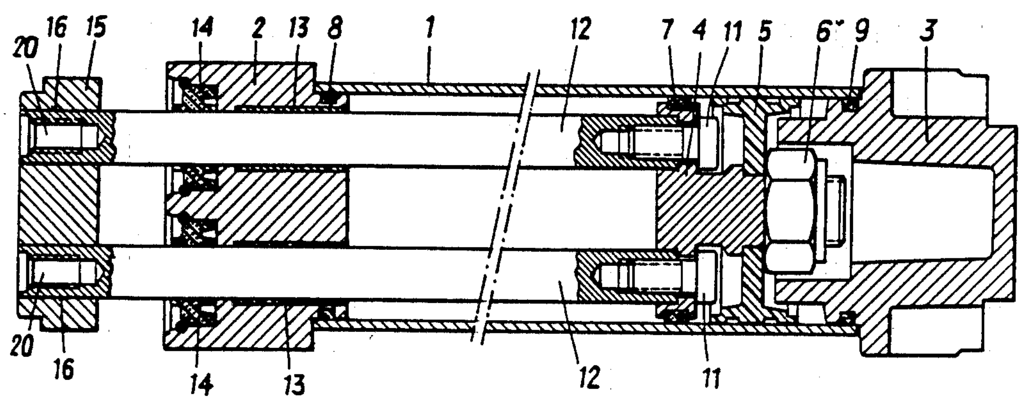
FIG. 1 shows an actuation device embodying the invention in axial cross-section.
Figure 2:
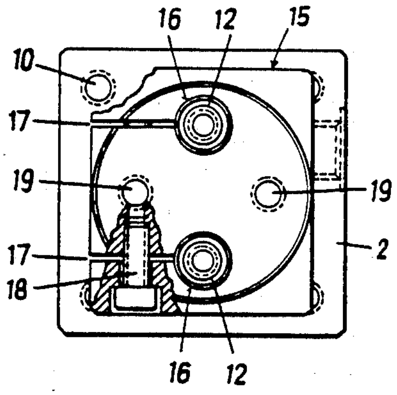
FIG. 2 shows a partially cut-away view of the securing disc.

The pneumatic actuation device shown in FIG. 1 comprises a tubular cylinder 1 which is sealed at one end by a cylinder cover 2 and at the other end by a base 3. In the cylinder 1 a piston 4 is slideably guided, on which a sealing sleeve 5 is secured by means of a screw nut 6. Furthermore, a guide ring 7 is disposed in a peripheral groove of the piston 4. The cover 2 and the base 3 are sealed against the cylinder 1 by one O-ring 8 or 9 in each case. It can be seen from FIG. 2 that the cover 2 and the base 3 are formed in a rectangular manner and are held together by means of tension bolts (not shown), which penetrate bores 10 disposed in their corners. On a radially-extending flange of the piston 4 there are secured by means of one screw 11 in each case, two piston rods 12 which extend parallel to each other and are disposed in a diametrically opposed manner on the piston 4. The screws 11 are in each case screwed into one threaded bore, provided in the front end of the associated piston rod 12, and draw the piston rods 12 into a seat bore of the piston 4. The two piston rods 12 are guided out through the cover 2 in which there is disposed a guide sleeve 13 and a sealing ring 14 for each piston rod. On the outer end of the two piston rods 12 there is attached a securing disc 15. The latter is provided with bores 16 into which the ends of the piston rods 12 are inserted. At the bores 16 there originate clamping slots 17, as can be seen in FIG. 2, which are provided with clamping screws 18 extending transversely with respect thereto. By tightening the clamping screws 18 the securing disc 15 is clamped rigidly on the ends of the piston rods 12. The piston rods 12 and associated bores 16 in the disc 15 are disposed centrally and symmetrically on an arc concentric to the cylinder axis.

By way of the securing disc 15 the drive connection to the machine parts to be driven by the actuation cylinder is produced. The securing disc 15 is, to this end, provided with connection bores 19, which are disposed advantageously on the securing disc 15 symmetrically to the cylinder axis and offset towards the piston rods 12. In the ends of the piston rods 12 there are furthermore provided axially-extending threaded bores, by means of which a direct connection between the piston rods 12 and the apparatus driven by the actuation cylinder can be produced, for example by inserting screws into the threaded bores 20. The bores 20 may, however, also be used to improve the connection to the securing disc 15.

It can be seen from FIG. 1 that the two piston rods 12 must extend exactly parallel to each other because otherwise when the piston 4 is extended they would become trapped in the guide sleeves. The securing of the securing disc 15 by means of clamped connections on the ends of the piston rods 12 prevents the piston rods 12, when mounting the securing disc 15, from being twisted, distorted or brought in any other manner out of their aligned parallel position such that, even after attaching the securing disc 15, perfect functioning of the actuation cylinder is ensured, without the guide sleeves 13 being subjected to excessive stress. Furthermore, by the arrangement of two piston rods 12, twisting of the piston 4 is reliably avoided during extending and retracting, and at the same time this ensures that the driven machine parts are not twisted, without additional structural measures being necessary for this.

What is claimed is:

1. In a fluid actuation device which includes a cylinder having opposite open ends; a cover enclosing one of the opposite open ends of said cylinder, said cover including two bores extending therethrough; a piston movably positioned within said cylinder; two piston rods which sealingly extend through the two respective bores in said cover, said piston rods having first ends which are fixedly attached to said piston and second ends which are located outside the cylinder; and a securing disc associated with the second ends of said piston rods; the improvement wherein said securing disc has an outer periphery and wherein it includes two bores extending therethrough in which the second ends of said piston rods can extend, said securing disc also including separate slots therein which extend from its outer periphery to its two bores and clamping means for closing each of said slots to fixedly grip the second ends of said piston ends in said bores therein and thus prevent twisting of said piston rods as said piston moves within said cylinder.

2. The fluid actuation device as defined in claim 1, wherein said clamping means comprise screws which extend within said securing means transversely to each of said slots.

3. The fluid actuation device as defined in claim 1, wherein the second end of each said piston rod includes an axially-extending threaded bore therein to enable direct connection to a machine part to be driven.

4. The fluid actuation device as defined in claim 1, wherein said securing disc includes means for connection to at least one machine part to be driven.

5. The fluid actuation device as defined in claim 1, including a base member enclosing the second of said opposite open ends of said cylinder.

6. In a fluid actuation device which includes a cylinder having opposite open ends; a cover enclosing one of the opposite open ends of said cylinder, said cover including two bores extending therethrough; a piston movably positioned within said cylinder; two piston rods which sealingly extend through the two respective bores in said cover, said piston rods having first ends which are fixedly attached to said piston and second ends which are located outside the cylinder; and a securing disc associated with the second ends of said piston rods; the improvement wherein said piston includes a radially-extending flange that has two axially-extending bores therethrough, wherein the first end of each said piston rod abuts against one side of said radially-extending flange adjacent a respective bore therein, wherein the first end of each said piston rod includes an axially-extending threaded bore therein, wherein a respective screw extends through a respective bore in said radially-extending flange from the second side thereof and into the axially-extending bore in the first end of the associated piston rod to fixedly attach the piston rod to said piston, and wherein said securing disc includes means for fixedly attaching the second ends of said piston rods thereto and thus prevent twisting of said piston rods as said piston moves within said cylinder.

* * * * *